Nov. 11, 1969 F. R. BRADLEY 3,478,259
VOLTAGE DIVIDER WITH CONSTANT SOURCE IMPEDANCE STAGES
Filed July 6, 1967 4 Sheets-Sheet 1

*INVENTOR.*
FRANK R. BRADLEY

ATTORNEYS

Nov. 11, 1969     F. R. BRADLEY     3,478,259
VOLTAGE DIVIDER WITH CONSTANT SOURCE IMPEDANCE STAGES
Filed July 6, 1967     4 Sheets-Sheet 2

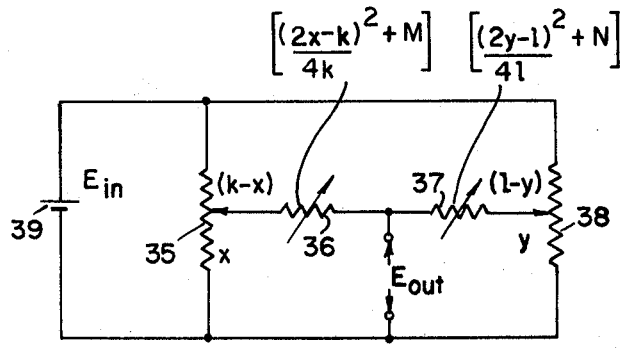

FIG. 4 x CONTRIBUTION:
$$E_{out} = \frac{\frac{l}{4}+N}{\frac{k}{4}+M+\frac{l}{4}+N} \left(\frac{x}{k}\right) E_{in}$$

y CONTRIBUTION:
$$E_{out} = \frac{\frac{k}{4}+M}{\frac{l}{4}+N+\frac{k}{4}+M} \left(\frac{y}{l}\right) E_{in}$$

$$Z_{source} = \frac{(\frac{k}{4}+M)(\frac{l}{4}+N)}{(\frac{k}{4}+M)+(\frac{l}{4}+N)}$$

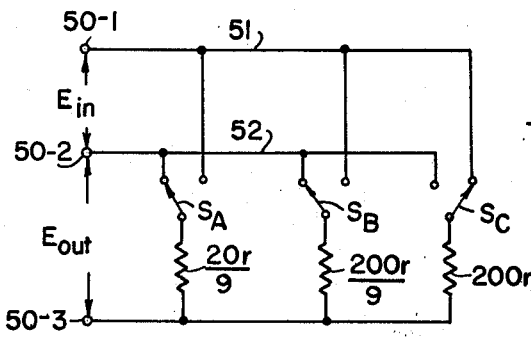

FIG. 8

$$\frac{E_{out}}{E_{in}} = .9 S_A + .09 S_B + .01 S_C$$

PRIOR ART

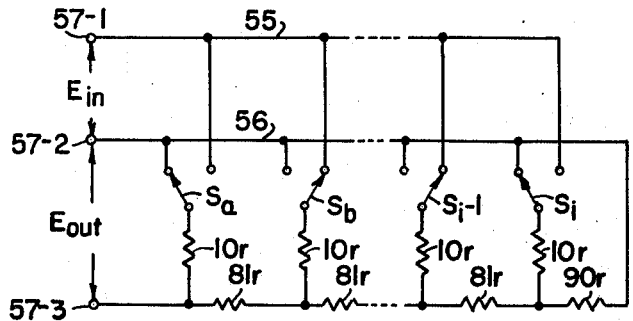

PRIOR ART

FIG. 10

$$\frac{E_{out}}{E_{in}} = .9 S_a + .09 S_a + \cdots + \frac{9 S_{i-1}}{10^{i-1}} + \frac{9 S_i}{10^i}$$

Nov. 11, 1969          F. R. BRADLEY          3,478,259
VOLTAGE DIVIDER WITH CONSTANT SOURCE IMPEDANCE STAGES
Filed July 6, 1967                    4 Sheets-Sheet 4

United States Patent Office 3,478,259
Patented Nov. 11, 1969

3,478,259
VOLTAGE DIVIDER WITH CONSTANT SOURCE IMPEDANCE STAGES
Frank R. Bradley, 9 Dash Place, New York, N.Y. 10003
Filed July 6, 1967, Ser. No. 651,424
Int. Cl. H02p 13/06
U.S. Cl. 323—43.5                                    19 Claims

ABSTRACT OF THE DISCLOSURE

A voltage divider stage having a constant source impedance. The stage consists of a series of impedance elements with compensating impedances connected to each junction. If the total impedance of the series is $k$ and if $x$ is the impedance between each compensating impedance and one end of the series, then the magnitudes of the compensating impedances are related by the formula $(2x-k)^2/4k$. By combining various stages together it is possible to derive multirange dividers with constant source impedances.

---

This invention relates generally to variable voltage divider circuits, and more particularly to "constant source impedance" dividers.

Resistance voltage dividers are of two general types, constant input impedance and constant output (source) impedance. In a constant input impedance divider, the impedance presented to the driving source, with the divider output terminals open-circuited, is substantially constant. The most well-known voltage divider of this type is the Kelvin-Varley divider. In a constant source impedance divider, on the other hand, the impedance presented by the divider to the load, with the divider input terminals short-circuited, or driven from a source with negligible impedance, is constant. As example of such a divider is that disclosed in Patent No. 2,784,369, issued to R. W. Fenemore et al. on Mar. 5, 1957.

Although constant input impedance and constant output impedance voltage dividers of various types are well known, usually the two features are not designed into a single unit. Generally, a divider is designed with one or the other of the two characteristics in mind.

It is a general object of this invention to provide a constant output (source) impedance variable voltage divider whose input impedance, while not constant, is less variable than the input impedances of prior art constant output impedance voltage dividers.

It is another object of this invention to provide a voltage divider stage of this type which may be used individually, in combination with other stages of the same type, or even as a stage in voltage dividers of prior art designs.

It is another object of this invention to provide a variable voltage divider in which the switching elements may be single-pole, multiposition devices.

It is another object of this invention to provide a voltage divider in which the divider resistance elements of the most critical range may be identical, matched resistance elements toleranced on a relative accuracy basis.

It is another object of this invention to provide a voltage divider in which the effect of switch contact resistance on current flow in the most critical range is reduced.

The basic voltage divider stage of my invention includes a plurality of impedances connected in series. Each junction of two of the series impedances is connected to a compensating impedance, the other end of which is connected to an output terminal. The input voltage is placed across the entire string of series impedance elements. The output voltage is taken between one end of the series string and a selected one of the output terminals. Depending on which output terminal is selected, the output voltage is a selected fraction of the input voltage.

The magnitudes of the compensating impedances are such that for any position of the selector switch, i.e., no matter which output terminal is selected, the output (source) impedance of the divider stage remains constant. That is, the impedance seen looking into the output terminals of the divider, with the input source short-circuited, is constant for all settings.

A general formula is developed for properly selecting the magnitude of each compensating impedance. Once an individual stage is derived it can be used in many different applications. For example, it can be incorporated in either a ladder or conductance type divider with the variable stage replacing an individual impedance in the prior art type circuit. With a complete divider stage replacing an individual impedance, it is possible not only to control in an on-off manner the contribution of the stage to the total output, but further to vary the contribution as well.

One of the major advantages of my basic voltage divider is that a number of stages may be incorporated in an overall divider in a unique manner. In many voltage dividers the output of a first stage feeds the input of a second, the output of the second feeds the input of a third, etc. The Kelvin-Varley divider, for example, is of this type. But in accordance with the principles of my invention all of the stages may be placed in parallel across the input source. Similarly, all of the output terminals are coupled together. By properly selecting the impedances in each stage, each stage can be designed to have a different weight. For example, the first stage might contribute to the output in steps of one volt, the second might contribute to the output in steps of .1 volt, the third might contribute to the output in steps of .01 volt, etc. No matter what the individual settings of the stages, because the output impedance of each stage is constant, the overall output impedance (the output impedance realized by placing all of the individual output impedances in parallel) is similarly constant.

It is a feature of my invention to provide a variable voltage divider stage having a plurality of impedances connected in series and a compensating impedance connected to the junction of each pair of impedances such that the output impedance of the stage is constant for all settings.

It is another feature of my invention to utilize the aforesaid stage in lieu of individual impedances in prior art voltage dividers.

It is still a further feature of my invention to place a number of the aforesaid stages in parallel across an input source and to couple all of the selected output terminals together to provide an overall constant source impedance variable voltage divider, with the individual impedances in each stage being selected such that decade dividers, or dividers of any other scales, can be obtained.

Further objects, features and advantages of my invention will become apparent upon consideration of the following detailed description in conjunction with the drawing, in which:

FIG. 4 depicts two of the circuits of FIG. 2 connected in parallel, with the output voltage and source impedance being derived in accordance with the equivalent circuit of FIG. 3B;

FIG. 8 illustrates a prior art conductance type voltage divider;

FIG. 10 depicts a prior art ladder type voltage divider;

Figure 1:
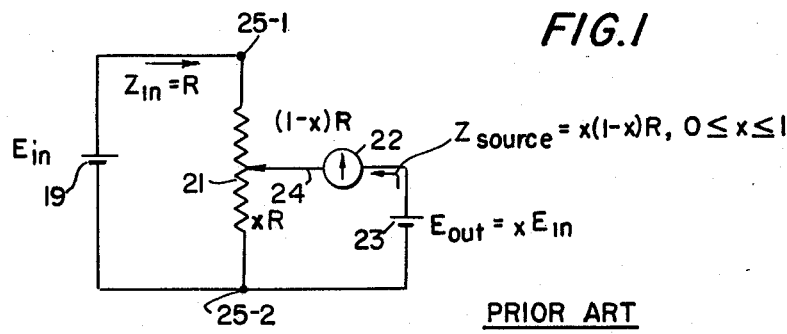
FIG. 1 depicts a basic prior art voltage divider and illustrates a typical use for it.

The basic prior art voltage divider circuit of FIG. 1 includes a potentiometer having an impedance 21 connected between terminals 25–1 and 25–2, and a variable contact 24. The input voltage source 19 is placed across the two terminals. The output voltage $E_{out}$ is taken between contact 24 and terminal 25–2. If, for example, it is desired to measure the magnitude of an unknown voltage source 23 as a fraction of the input voltage, the unknown source is connected between terminal 25–2 and one end of galvanometer 22. The other end of the galvanometer 22. The other end of the galvanometer is connected to contact 24.

The total impedance of the potentiometer is R. The fraction $x$ varies between 0 and 1 as tap 24 moves along the impedance. For any setting, the potentiometer impedance is divided into two parts $xR$ and $(1-x)R$ as shown in the drawing. The tap is moved until no current flows through the galvanometer. At this time the fraction $x$ of the potentiometer impedance between contact 24 and terminal 25–2 represents the fraction of the input voltage which corresponds to the unknown output voltage.

As shown in the drawing the input impedance $Z_{in}$ is equal to R independent of the tap setting when a balance condition is achieved because no current flows through the galvanometer and the input voltage source sees the full impedance of the potentiometer. (Effectively, the output is open-circuited as required in the determination of input impedance.) The output impedance $Z_{source}$ (with the input voltage source short-circuited) consists of the two sections of the potentiometer impedance connected in parallel. The output impedance then is equal to $xR$ in parallel with $(1-x)R$ or $x(1-x)R$. As $x$ varies between 0 and 1 it is apparent that the source impedance varies from 0, to a maximum equal to $R/4$, and then back to 0. A primary purpose of my invention is to provide a voltage divider in which this variation does not take place.

Figure 2:
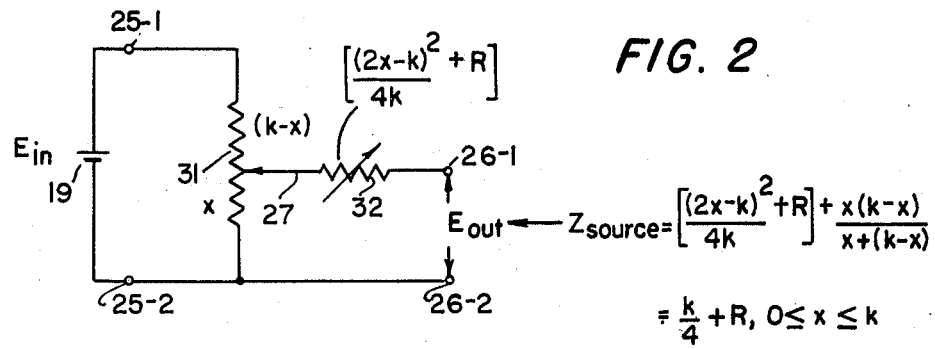
FIG. 2 illustrates symbolically the principles of the invention with reference to the basic prior art voltage divider of FIG. 1.

In the voltage divider circuit of FIG. 2 a potentiometer of total impedance $k$ is placed across input terminals 25–1 and 25–2. The input voltage source is similarly placed across these terminals. Output terminal 26–2 is connected to input terminal 25–2. Output terminal 26–1 is connected to one end of variable impedance 32, the other end of which is connected to the variable tap 27 of the potentiometer. The letter $x$ represents the impedance between tap 27 and the lower end of the potentiometer. This impedance can thus vary between 0 and the full value of $k$. The source impedance, that is, the impedance seen looking into terminals 26–1 and 26–2, may be maintained constant if the value of resistor 32 is varied in accordance with the formula shown for each setting of $x$. The impedance consists of two components, one dependent on the values of $x$ and $k$, and the other being an arbitrary constant R.

The output impedance consists of resistor 32 in series with the resistance of the two parts of the potentiometer impedance connected in parallel, as shown in the drawing, with the input source being considered a short-circuit. The output impedance reduces to the value $(k/4)+R$. It is seen that the output impedance is thus independent of the tap setting for all values of $x$ between 0 and $k$, assuming the impedance of the input source is negligible.

Figure 3A:
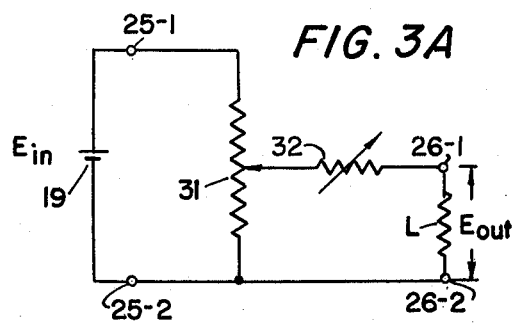
FIG. 3A shows the divider of FIG. 2 placed across a load impedance and FIG. 3B shows the equivalent circuit for deriving the output voltage.

FIG. 3A is identical to FIG. 2 except that a load impedance L is shown across the output terminals. To derive the voltage across the load, it is most convenient to draw the equivalent circuit seen looking to the left of the output terminals, the equivalent circuit being shown in FIG. 3B. The source impedance is that shown in FIG. 2, namely $(k/4)+R$. The equivalent voltage source of FIG. 2 is determined in accordance with well-known principles by computing the voltage across the output terminals when they are open-circuited. Based on the analysis given with respect to FIG. 1, the equivalent source is simply $(x/k)E_{in}$, as shown. The fraction of the equivalent voltage source which appears across the output terminals is equal to the ratio of imedance L to the sum of L and the source impedance, $(k/4)+R$. In terms of the actual input voltage of source 19, the output voltage is $(L/((k/4)+R+L))\cdot(x/k)E_{in}$.

Still working with continuously variable impedances, FIG. 4 depicts two voltage divider stages, each having the necessary compensating impedance, connected in parallel across an input voltage source 39 of magnitude $E_{in}$. Potentiometer 35 has a total impedance $k$ and potentiometer 38 has a total impedance $l$. The letter $x$ represents the impedance between the lower terminal of potentiometer 35 and the tap, and varies as the tap is moved. Similar remarks apply to the letter $y$ and potentiometer 38. Each of variable resistors 36 and 37 has a value dependent on the respective setting of $x$ and $y$ in accordance with the formula given in FIG. 2. Impedance components M and N are arbitrary as was component R in FIG. 2.

With respect to FIG. 4 it should be noted that the two pairs of input terminals are connected in parallel, and the two pairs of output terminals are connected in parallel as well. It is necessary to determine the contribution of each voltage divider stage to the total output in order to determine the total output voltage. Each stage can be considered individually in accordance with the principle of superposition, and the two contributions can be added together to determine the total output. With respect to the left stage, the load impedance is simply the impedance seen looking into the output terminals of the right stage. But in accordance with the formula developed in FIG. 2, this output (source) impedance is simply $(l/4)+N$. Consequently, using the formula for the output voltage derived in FIG. 3B, the contribution of potentiometer 35 to the output voltage is as shown in FIG. 4. Similarly, the contribution of potentiometer 38 to the output voltage can be determined in a similar manner. Here, the load impedance is that seen looking into the output of the left stage, i.e., $(k/4)+M$. Based on the formula shown in FIG. 3B, with the source impedance of the right stage being $(l/4)+N$ and its load impedance being $(k/4+M)$, the $y$ contribution to the output voltage is as shown. The total output voltage is the sum of the two components.

As for the total source impedance, that is, the impedance seen looking into the two output terminals, it is simply the parallel combination of the two individual source impedances. The formula for the total source impedance is shown in FIG. 4. Since each of the individual impedances is independent of the setting of the respective potentiometer, the overall source impedance remains constant.

It should be noted that the output voltage can equal the full input voltage. With $(l/4+N)=a$ and $$(k/4+M)=b$$

the total output voltage $$E_{out}=(a/(a+b))(x/k)E_{in}+(b/(b+a))(y/l)E_{in}$$

With $x=k$ and $y=l$, at full settings, $$E_{out}=(a+b)/(a+b)E_{in}=E_{in}$$

Although at a given instant the fractions $x/k$ and $y/l$ may be equal, the two voltage contributions may be unequal. Although both denominators are the same, the numerators are different. If they differ by a factor of ten, for example, one stage will have ten times the effect of the other on the output. It is this characteristic, as will be described below, which permits the design of dividers having stages with different scale factors.

It is also possible to couple more than two stages together. If three stages, for example, have respective source impedances of $a$, $b$ and $c$, if their potentiometer impedances are respectively $k$, $l$ and $m$, and if their respective partial potentiometer impedances between their taps and the common input-output terminals are $x$, $y$ and $z$, then the total output is $$E_{out}=\left[\frac{bc}{ab+bc+ac}\left(\frac{x}{k}\right)+\frac{ac}{ab+bc+ac}\left(\frac{y}{l}\right)+\frac{ab}{ab+bc+ac}\left(\frac{z}{m}\right)\right]E_{in}$$

Since the denominator of each scale factor is the same, the ratio of the three scale factors is $bc:ac:ab$. If values of 100:10:1 are selected, a 3-decade voltage divider can be obtained. Its source impedance is constant because the output impedance of each stage is constant, and the three outputs are simply paralleled together.

If the individual stages are connected to different voltage sources the circuit is operative to add the various voltages together, with different weights, however, depending on the potentiometer settings. In all cases the output impedance remains the same no matter what the weights of the different source magnitudes.

Figure 5:
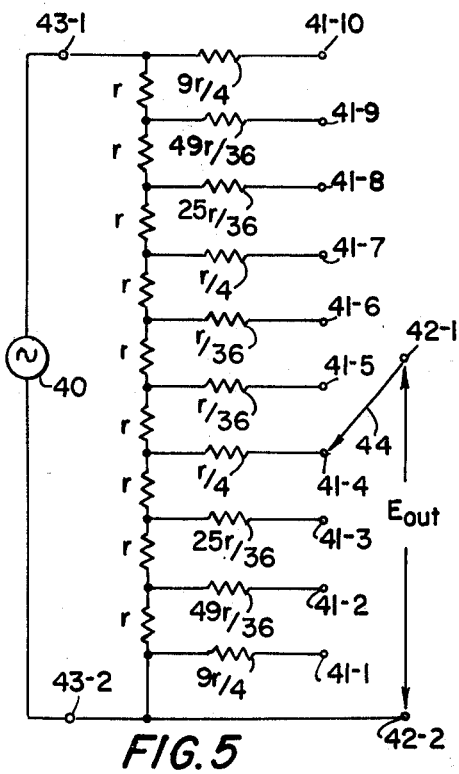
FIG. 5 depicts an illustrative embodiment of the invention based on the circuit of FIG. 2, in which discrete ratios of output to input voltages may be selected.

The circuit of FIG. 4 illustrates how two or more voltage divider stages may be designed and combined to provide a constant source or output impedance. Before illustrating an actual circuit of this type, however, it is necessary to consider an individual voltage divider stage constructed in accordance with the principles of my invention. This stage is shown in FIG. 5. The impedance values are based on the compensating impedance formula of FIG. 2.

Input source 40 is connected across input terminals 43–1 and 43–2. Output terminals 42–2 is connected to input terminals 43–2. Output terminal 42–1 can be coupled by switch 44 to any one of the ten terminals 41–1 through 41–10. (Switch 44, shown connected to terminal 41–4 for illustrative purposes, is only symbolic—it can be a mechanical switch, a transistor switch, etc.)

The stages includes 9 resistors, each of value $r$ connected in series between the two input terminals. The total input impedance is thus $9r$. Depending upon the selected one of terminals 41–1 through 41–10, the output voltage can assume any one of ten values, separated by nine equal steps. The minimum open-circuited voltage is zero when switch 44 is connected to terminal 41–1, and the maximum output voltage is equal to the voltage of source 40, when switch 44 is connected to terminal 41–10.

The values of the compensating impedances are derived as follows. Consider, for example, the impedance connected to terminal 41–4. The three lower resistors of value $r$ correspond to impedance $x$ in FIG. 2, and the six upper impedances of value $r$ correspond to impedance $(k-x)$ in FIG. 2. Thus, analogizing to FIG. 2, $x$ has a value of $3r$ and $k$ has a value of $9r$. The compensating impedance, in accordance with the formula of FIG. 2 and where a value for R of 0 is chosen, is $$\frac{(6r-9r)^2}{36r}+0$$

or $r/4$, as shown. In a similar manner the compensating impedance for each of the others of terminals 41–1 through 41–10 may be determined. No matter which terminal switch 44 is connected to, the source impedance is constant. Based on the formula given in FIG. 2, since R is 0 and $k$ is $9r$, the source impedance is $9r/4$.

Figure 3B:
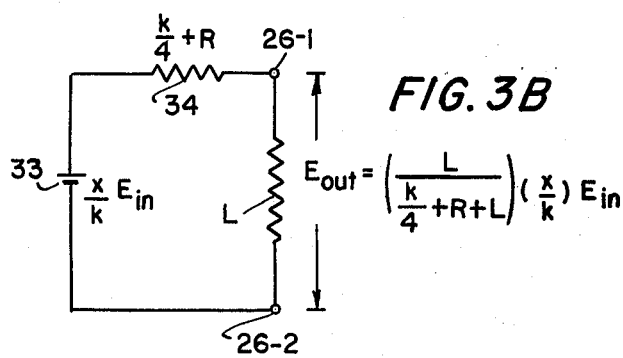

Consider next the ratio of the output voltage to the input voltage. With the output terminals open-circuited, the load impedance, shown as L in FIGS. 3A and 3B, is infinite, and the ratio of the voltages is simply $x/k$. With switch 44 connected to terminal 41–1, $x$ is 0 and the output voltage is 0. With the switch connected to terminal 41–2 the ratio of $x/k$, or the output voltage to the input voltage, is $r/9r$ or $1/9$. Similar remarks apply to the other settings. The output voltage is variable in 9 equal steps to provide 10 discrete ratios.

Analysis and experimentation shows that the input impedance of the circuit of FIG. 5 is constant when the stage is unloaded and is less variable than the input impedances of prior art constant source dividers when multiple stages are used.

Figure 6:
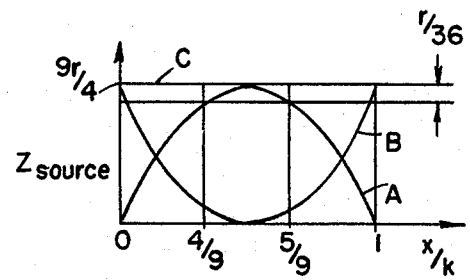
FIG. 6 shows two curves, A and B, which depict the two components of the total source impedance of the circuit of FIG. 5.

The curves of FIG. 6 illustrate the two components of impedance which contribute to the total source impedance seen looking into terminals 41–1 and 42–2. The total output impedance, given by the formula of FIG. 2, is simply $9r/4$, as shown by line C. Part of this impedance is contributed by the series resistors themselves. The contribution (assuming the compensating impedances are omitted) various from a minimum value of 0 when the ratio $x/k$ is 0, increases and then returns to 0 when the ratio $x/k$ is 1, as shown by curve A. In the two extreme cases, of course, the output terminals are shorted together when switch 44 is connected to terminals 41–1 or 41–10. Between the two extreme points the curve has a parabolic shape similar to that obtained for the source impedance equation of FIG. 1. Although the curve is shown as continuous, it is to be understood that there are in reality only ten discrete points when should be represented for the ten discrete positions of switch 44.

Curve B represents the contribution of the compensating impedances. The impedances are greatest at the extreme points where the contributions of the series resistors are zero. In fact, the compensating impedances at these points must equal the desired output source impedance $9r/4$. Toward the middle settings the compensating impedances get smaller and smaller since the contributions of the series resistors get larger and larger. At each of the ten discrete values of $x/r$ the sum of the two impedance values equals $9r/4$.

From the curves of FIG. 6 it is apparent that the maximum of curve A and the minimum of curve B are reached between the values for $x/k$ of $4/9$ and $5/9$. Since there is no discrete value of source impedance required between the two values of $4/9$ and $5/9$, it is apparent that the total source impedance line C can be lowered to the point where it intersects the A curve at the values for $x/k$ of $4/9$ and $5/9$. Of course, the B curve will have to be lowered the same amount so that the sum of A and B will still equal C. The B curve will then intersect the horizontal axis at the two values of $4/9$ and $5/9$. The lower tip of the B curve will be negative, but since there is no requirement for a compensating impedance between the values for $x/k$ of $4/9$ and $5/9$, the fact that a negative impedance may not be provided is immaterial.

Figure 7:
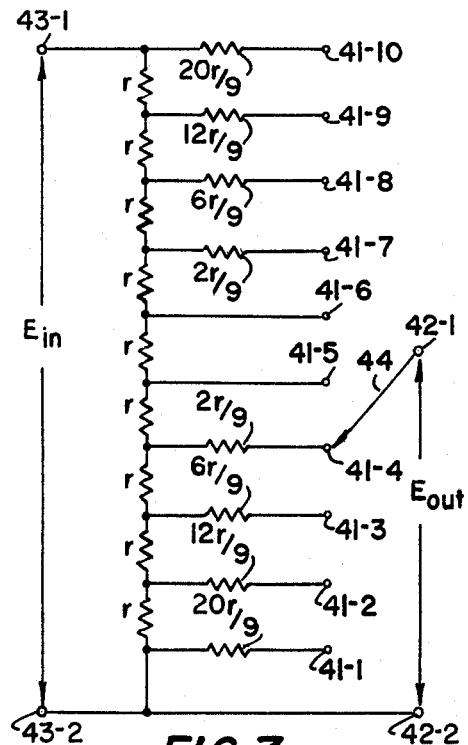
FIG. 7 is another illustrative embodiment of the invention, based on the circuit of FIG. 5, but modified in accordance with the curves of FIG. 6 to eliminate two of the impedances.

Referring to FIG. 5 the lowering of line C and curve B is accomplished physically by removing the two resistors connected to terminals 41–5 and 41–6. If these two resistors of values $r/36$ are removed it is of course necessary to reduce each of the other resistances by the same magnitude, i.e., to lower curve B on FIG. 6 by a constant amount. The new circuit is shown in FIG. 7. For all intents and purposes it is identical to the circuit of FIG. 5 except that two resistors are omitted and the others are decreased in magnitude. Of course, the source impedance is reduced by the value $r/36$ since effectively this value has been subtracted from the impedance seen looking into each of the terminals 41–1 through 41–10. The new source impedance is $9r/4$ less $r/36$, or $20r/9$. This value can be determined by inspection—it is the magnitude of the compensating resistors in the two extreme branches where the series resistor contributions (curve A) are zero.

Many alternatives are available. For example, a constant impedance R can be added in series with each of the terminals 41–1 through 41–10 in accordance with the general formula given in FIG. 2. Similarly, a single impedance can be placed in series with switch 44 to increase the output impedance.

Figure 9:
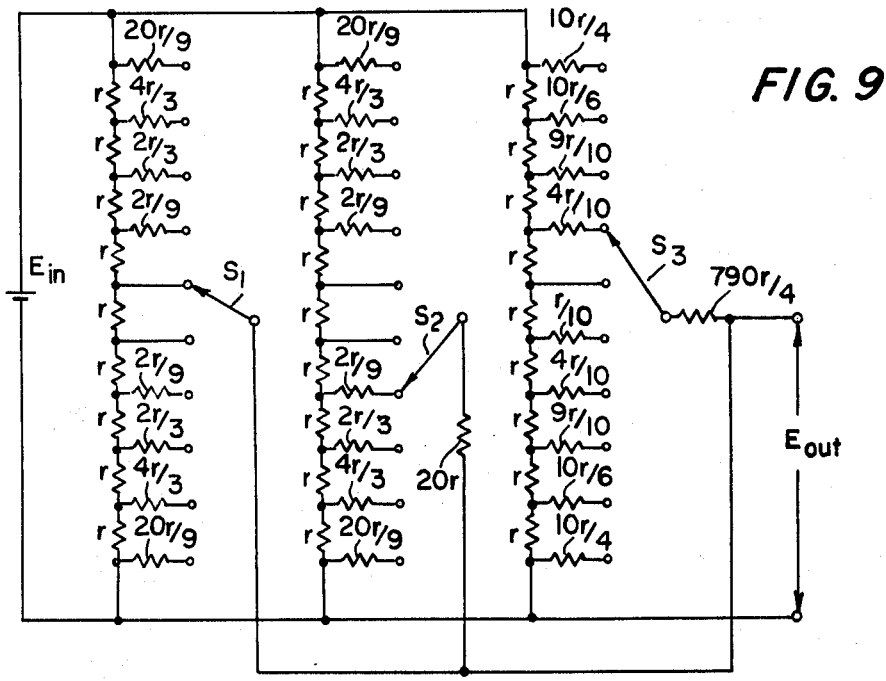
FIG. 9 is another illustrative embodiment of my invention in which individual stages, such as those depicted in FIGS. 5 and 7, replace individual impedances in the circuit of FIG. 8.

The circuit of FIG. 8 depicts a prior art conductance type voltage divider on which is based the embodiment of the invention illustrated in FIG. 9.

The input voltage is applied between terminals 50–1 and 50–2. The output voltage is taken across terminals 50–2 and 50–3. One end of each of the three resistors is connected to terminal 50–3. Depending on the setting of the respective one of switches $S_A$, $S_B$ and $S_C$, each resistor is connected to either conductor 51 or conductor 52. With the values of resistors shown, it can be shown that the ratio of the output voltage to the input voltage is in accordance with the equation given in the drawing. In the equation, each of the symbols $S_A$, $S_B$ and $S_C$ assumes a value of 0 or 1 depending on the switch position, a 1 if the switch is to the right and a 0 if the switch is to the left. This type of prior art voltage divider is of the constant source impedance type because it is seen that if the input terminals are shorted together it makes no difference in which position each of the switches is placed as far as the output impedance is concerned. The two terminals in each switch are effectively short-circuited to each other. However, the circuit suffers from the disadvantage that the input impedance varies over an infinite range.

In accordance with the principles of my invention the two leftmost resistors in FIG. 8 are replaced by two stages identical to that shown in FIG. 7. A slightly different stage is provided for the rightmost resistor as will be described below. When the individual resistors are replaced by divider stages in this manner it is seen that the resulting circuit of FIG. 9 is very similar to that shown in FIG. 4 for the continuous potentiometer case. As long as each of the stages is designed such that for each setting the output impedance is constant, the overall output impedence, which is the equivalent impedance of the three source impedances connected in parallel, remains constant.

Referring to FIG. 7 it is seen that the output impedance of the voltage divider is $20r/9$ (the value of the compensating resistors connected to terminals 41–1 and 41–10). Consequently, the output impedance of the leftmost stage in FIG. 9 is the same as the leftmost impedance in FIG. 8. With respect to the second stage of FIG. 9, the output impedance from the divider stage itself is also $20r/9$ but since switch $S_2$ is in series with an impedance of $20r$, the total impedance is $(20r/9)+20r$, or $200r/9$. This is the same as the equivalent resistor in FIG. 8. As for the rightmost stage in FIG. 9, to be described in further detail below, the output impedance is $10r/4$ (the value of the resistors connected to the uppermost and lowermost terminals). Since switch $S_3$ is connected in series with a resistor of value $790r/4$, the total output impedance is $(10r/4+790r/4)$, or $200r$, which is the same as the value of the rightmost resistor in FIG. 8. Consequently, the general equation set forth in FIG. 8 applies to the circuit of FIG. 9. The only difference is that within each stage the voltage contribution to the total output can be varied in discrete steps.

The three voltage contributions are additive just as the two voltage contributions in FIG. 4 are additive. For an input voltage of 1 volt, for example, the leftmost stage in FIG. 9 can contribute a voltage component to the total output voltage of 0, .1, .2, . . ., .9 volt. The middle stage can contribute a component of .01, .02, . . ., .09 volt. The third stage, because it has one additional terminal, can contribute components of .001, .002, . . ., .009, .01 volt. To obtain a total output voltage of 1 volt, all three switches should be placed at their uppermost positions in which case the three voltage components are .9, .09 and .01 volt, or a total of 1 volt.

With respect to the rightmost stage in FIG. 9, the compensating impedances follow the formula given in FIG. 2, and the outer impedance has a magnitude of $200r$ for all settings, as required in accordance with FIG. 8. The reason for using a slightly different arrangement (eleven output taps instead of ten) is that to obtain a maximum divider ratio of 1 it is necessary to vary the rightmost stage such that the output voltage can assume any one of eleven values separated by ten equal steps. This is due to the fact that the first two stages are each designed such that they can only go to $9/10$ of full scale, and to obtain a total value of unity the rightmost stage must be capable of contributing to the output voltage to an extent equal to that contributed to the output by the middle stage at its lowest setting. Thus the rightmost stage requires ten resistors connected in series, rather than nine, if the switch dial is to be direct decimal reading. Starting with ten resistors of value $r$, each compensating resistor can be determined in accordance with the formula of FIG. 2. A transformation can then be made similar to the transformation made between the circuits of FIGS. 5 and 7. The minimum resistor can be omitted entirely and each of the other compensating resistors can be reduced in magnitude by the same amount. Once this is done and the new value of source impedance for the stage is determined (equal to either of the two extreme compensating resistors) the additional resistor of $790r/4$ can be inserted to provide a total impedance of $200r$ in accordance with the circuit of FIG. 8.

In general, a circuit of the type depicted in FIG. 9 is designed as follows. First, the number of stages, i.e., the number of ranges, and their respective weights are selected. Although in FIG. 9 three stages of weights of .9, .09 and .01 are shown, many other variations are possible. For example, the stage weights may vary by factors of 2 rather than factors of 10. With the various weights selected the ratio of the individual source impedances can be determined in accordance with previously described formulas. The number of discrete steps desired for each stage is then selected, and the stage is designed to provide this number of steps and the proper output impedance. (The steps need not be equal; for example, a 4–2–2–1 code may be used. Also, the stage may be designed to be nonlinear to compensate for nonlinearities in the output voltage functions of specific transducers.)

For example, consider the network of FIG. 9. This network has three ranges. As shown in FIG. 8, their relative weights are .9, .09 and .01. As described above, if $a$, $b$ and $c$ are the respective output impedances, then $$bc/(ab+bc+ac)=.9, \quad ac/(ab+bc+ac)=.09 \text{ and}$$
$$ab/(ab+bc+ac)=.01$$

Although there are three equations and three unknowns, the equations permit only the ratio of $a$, $b$ and $c$ to be determined. As shown in FIG. 8, the ratio is $20/9:200/9:200$. The number of output ratios for each stage is then selected, in this case 10, 10 and 11. The steps need not be equal although they are in FIG. 9. The first stage is then designed with an arbitrary value $r$ being selected for the series resistors. The compensating resistors are then computed. The source impedance for the stage can be varied by dropping some of the resistors (two in FIG. 9) and decreasing the magnitudes of the others. Similarly, an additional resistor can be added, if desired, in series with the selector switch or even in series with each compensating impedance. Once the output impedance is selected, the output impedances of the other two stages are determined in accordance with the ratio 20/9:200/9:200. These stages are then designed in accordance with the number of steps and the output impedance required for each. Many alternatives are possible. For example, it is not necessary to use resistors of value $r$ in the series strings of the other stages, provided the impedances in series with switches $S_2$ and $S_3$ are such that the total output impedance of each stage has the required magnitude.

The circuit of FIG. 10 illustrates still another prior art voltage divider circuit in which the source impedance is constant. In this ladder-type network, each of the switching resistors has the same value ($10r$), unlike the circuit of FIG. 8. However, the circuit of FIG. 10 requires additional resistors of values $81r$, and still another of value $90r$. The input voltage is applied between terminals 57–1 and 57–2, and the output voltage is taken across terminals 57–2 and 57–3. Each of the resistors of value $10r$ is connected by a respective one of switches $S_a$ through $S_i$ to one of conductors 55 and 56. The ratio of the output voltage to the input voltage is as shown in the drawing. In the equation, each of the symbols $S_a$ through $S_i$ is a 1 or 0 depending on the position of the respective switch. If a switch is to the left, its respective value in the equation is 0; if it is to the right, its respective value is 1. The maximum ratio of output to input voltage is .999 .... (A maximum ratio of unity can be obtained, as is known in the art, by removing the resistor of magnitude $90r$, and replacing the rightmost resistor of value $10r$ by a resistor of magnitude $9r$, or alternatively by returning the $90r$ resistor to conductor 55. The circuit of FIG. 10 is only illustrative of the ladder-type voltage dividers in which the constant source impedance stage of my invention can be utilized.)

Figure 11:
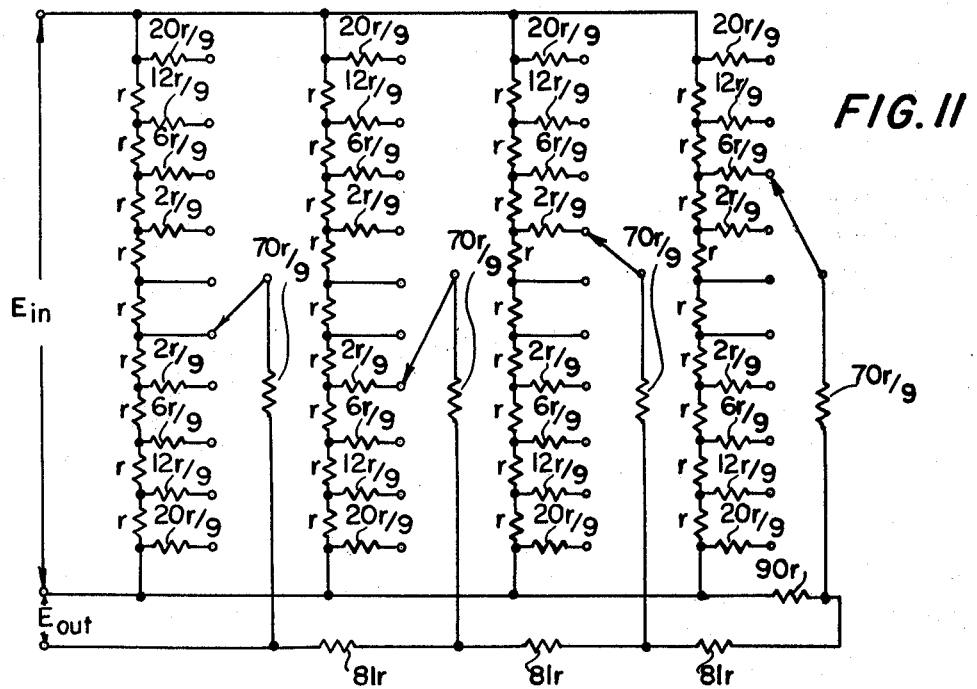
FIG. 11 depicts another illustrative embodiment of my invention in which individual stages, such as those depicted in FIGS. 5 and 7, replace individual impedances in the circuit of FIG. 10.

The circuit of FIG. 11 is the same as that of FIG. 10 except that each of the impedances of value $10r$ has been replaced by a complete stage. Instead of providing the S switches of FIG. 10 for connecting each stage to either one of the two input lines, the stages are inserted in the circuit such that effectively they are always connected to line 55 of FIG. 10. Each stage has a source impedance of $20r/9$ (the magnitude of the two extreme resistors in each stage). Since the circuit of FIG. 10 requires an impedance of $10r$ for each stage, a resistor of value $70r/9$ is placed in series with each selector switch. Thus, the total impedance of each stage is $20r/9+70r/9$, or $10r$.

Instead of each stage being capable of providing only a yes-no type of operation, each stage is capable of contributing to the output voltage in 9 discrete steps. Each stage has the weight of the equivalent stage in FIG. 10, and depending on the position of each selector switch, the contribution of the respective stage to the total output voltage is 0, 1/10, 2/10 . . ., 9/10 of the voltage weight.

Figure 12A:
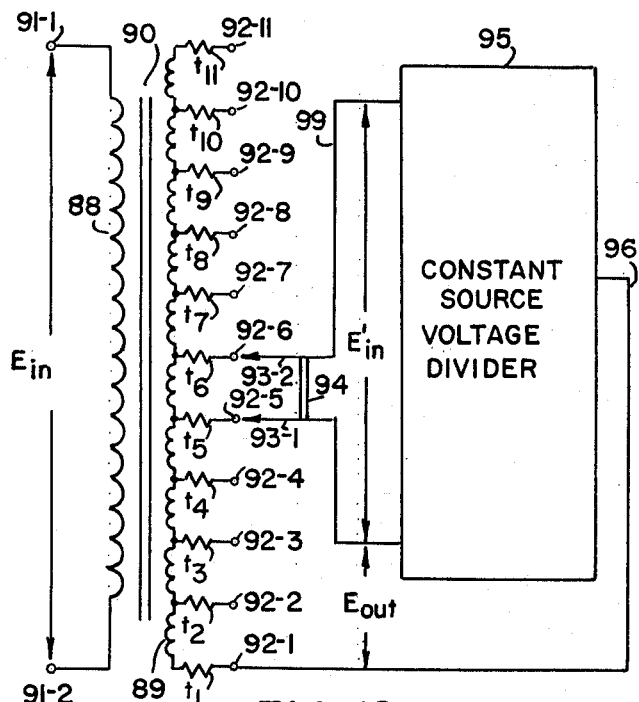
FIG. 12A depicts another illustrative embodiment of my invention.

The circuit of FIG. 12A includes a constant source voltage divider, shown only symbolically by the numeral 95, which may be of the types illustrated in FIGS. 9 and 11. The divider 95, however, represents only the second through the last stages. The first stage is comprised of transformer 90 having a primary winding 88 and a secondary winding 89. The secondary winding has a plurality of taps terminating at terminals 92–1 through 92–11. In series with the taps are respective resistors $t_1$–$t_{11}$ which serve to compensate the transformer impedance such that a constant source impedance is obtained for all settings. The input voltage is applied across terminals 91–1 and 91–2. The input voltage $E'_{in}$ to voltage divider 95 is that voltage appearing across contacts 93–1 and 93–2. These two movable contacts are ganged together as shown at 94, and depending on the position of the switch the input voltage to divider 95 is that across any two adjacent ones of terminals 92–1 through 92–11. (Alternatively, an autotransformer may be used as in the circuit of FIG. 12B.)

Voltage divider 95 can be of the types previously considered. Conductors 98 and 99 are the two input conductors. Conductor 98 is also one of the output conductors, and conductor 96 is the other conductor in the output pair. Conductor 96 is tied to terminal 92–1. With the circuit of FIG. 12A, only one-tenth of the input voltage $E_{in}$ is applied to the input terminals of divider 95. The switches in divider 95 determine the ratio of this voltage to the output voltage. In effect, transformer 90 serves as an additional stage in the overall divider.

Figure 12B:
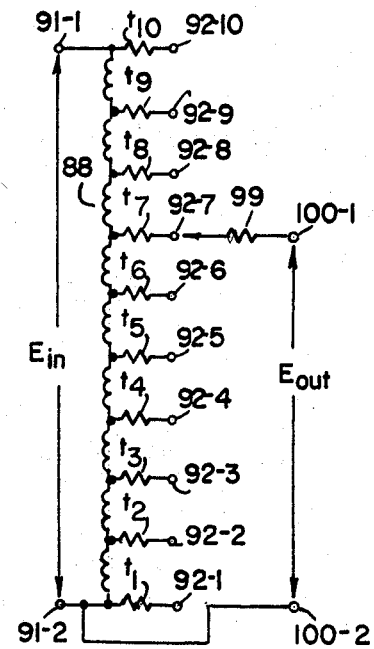
FIG. 12B depicts still another illustrative embodiment of my invention.

It is also possible to use a transformer for the stage of FIG. 7, as shown in FIG. 12B, it being understood that terminals 100–1 and 100–2 are to be connected to a succeeding stage such as the first stage in FIG. 7 or 11. (Alternatively, a two-winding transformer of the type shown in FIG. 12A may be used. This arrangement can provide an additional scale factor to the stage contribution if desired.) The input source is connected across terminals 91–1 and 91–2. Compensating impedances are provided as well as a single resistor 99, comparable to resistor component R in FIG. 2. The use of transformer stages in general is advantageous in that high precision equipment may be designed at minimum cost.

Although the invention has been described with reference to particular embodiments, it is to be understood that these embodiments are merely illustrative of the applications of the principles of the invention. Numerous modifications may be made therein and other arrangements may be devised without departing from the spirit and scope of the invention.

What is claimed is:

1. A voltage divider comprising a plurality of stages; each stage including a first pair of terminals for connection to an input voltage source, a second pair of terminals for connection to an output circuit, means for electrically connecting to each other one terminal in each of said pairs, a plurality of impedance elements connected in series between said connected terminals and the other terminal in said first pair, a plurality of compensating impedances each connected at one end to an end of said series impedance elements, with two of said compensating impedances being connected respectively to the two terminals in said first pair, and means for selectively connecting the other of said terminals in said second pair to the other end of one of said compensating impedances, each of said compensating impedances having an impedance magnitude such that the total impedance between said one terminal of said second pair and each of said compensating impedance other ends in the same when said first pair of terminals are short-circuited to each other; and means for coupling together all of the second pair terminals in each of said stages.

2. A voltage divider in accordance with claim 1 wherein all of said first pair terminals in each of said stages are coupled together for connection to the same input voltage source.

3. A voltage divider in accordance with claim 1 wherein in each of said stages said compensating impedances have magnitudes related by the formula $(2x-k)^2/4k$, where $k$ is the total impedance of all of said plurality of series connected impedance elements and $x$ is the impedance of the series impedance elements connected between said connected terminals and said one end of the respective compensating impedance.

4. A voltage divider in accordance with claim 3 wherein in each of said stages all of said plurality of series impedance elements have the same impedance magnitude.

5. A voltage divider comprising a plurality of stages; each stage including a first pair of terminals for connection to an input source, a second pair of terminals for connection to an output circuit, a plurality of impedance elements connected in series between said terminals in said first pair, a plurality of compensating impedances each connected at one end to an end of one of said series impedance elements, with two of said compensating impedances being connected respectively to the two terminals in said first pair, and means for selectively connecting said second pair of terminals to said series connected impedance elements through one of said compensating impedances, each of said compensating impedances having an impedance magnitude such that the total impedance between said terminals in said second pair is the same independent of the particular connection established by said connecting means; and means for coupling the output voltage across the second pair terminals in all of said stages to the same output circuit.

6. A voltage divider in accordance with claim 5 wherein in each of said stages said compensating impedances have magnitudes related by the formula $(2x-k)^2/4k$, where $k$ is the total impedance of all of said plurality of series connected impedance elements and $x$ is the impedance of the series impedance elements connected between one of said terminals in said first pair and said one end of the respective compensating impedance.

7. A voltage divider in accordance with claim 6 wherein in each of said stages all of said plurality of series impedance elements have the same impedance magnitude.

8. A voltage divider comprising a first pair of terminals for connection to an input source; a second pair of terminals for connection to an output circuit; and a plurality of voltage divider stages, each of said stages having a plurality of series connected impedance elements connected between the terminals in said first pair, a plurality of compensating impedances each connected at one end to an end of one of said series impedance elements, with two of said compensating impedances being connected respectively to the two terminals in said first pair, and means for selectively connecting the other end of one of said impedance elements and one end of said series connected impedance elements to the terminals in said second pair, each of said compensating impedance elements having an impedance magnitude such that the total output impedance of the stage as seen at the terminals in said second pair is constant independent of the particular connection established by said connecting means; all of said stages having output impedances related to each other such that the voltage divider can be operated in discrete steps by variations of said connecting means in each of said stages without affecting the total output impedance of the voltage divider.

9. A voltage divider in accordance with claim 8 wherein said compensating impedances in each stage have magnitudes related by the formula $(2x-k)^2/4k$, where $k$ is the total impedance of all of said series connected impedance elements in the stage and $x$ is the impedance of the series connected impedance elements connected between one of the terminals in said first pair and said one end of the respective compensating impedance.

10. A voltage divider in accordance with claim 9 wherein all of the series connected impedance elements in each stage have the same impedance magnitude.

11. A voltage divider in accordance with claim 9 wherein all of the series connected impedance elements in all of said stages have the same impedance magnitude.

12. A voltage divider in accordance with claim 8 wherein the output impedances of at least two of said stages differ by a factor of ten.

13. A voltage divider in accordance with claim 9 wherein the output impedances of at least two of said stages differ by a factor of ten.

14. A voltage divider in accordance with claim 8 wherein selected ones of said stages are provided with additional impedances in series with the respective connecting means to establish a predetermined ratio between the output impedances of said stages.

15. A voltage divider comprising a first pair of terminals for connection to an input source; a second pair of terminals for connection to an output circuit; a plurality of voltage divider stages, each of said stages having a plurality of series connected impedance elements and a plurality of compensating impedances each connected at one end to an end of one of said series impedance elements, with two of said compensating impedances being connected respectively to the two ends of said series connected impedance elements; means for connecting each of said series of impedance elements across said first pair of terminals; a group of impedances connected in series between the two terminals in said second pair; and means for selectively connecting the other end of one of said compensating impedance elements in each of said stages to an end of a respective one of said impedance elements in said group connected between the terminals in said second pair.

16. A voltage divider in accordance with claim 15 further including impedance elements connected in series with respective ones of said connecting means.

17. A voltage divider in accordance with claim 15 wherein the values of said series connected impedance elements and said compensating impedances in each of said stages are such that the output impedance of each of said stages is constant independent of the position of the respective connecting means.

18. A voltage divider comprising an input transformer, said input transformer having a pair of terminals for connection to an input voltage source and at least one transformer winding, a plurality of compensating impedances, a plurality of terminals each connected through a respective one of said compensating impedances to a respective tap on said at least one transformer winding, with two of said compensating impedances being connected to the two ends of said at least one transformer winding, at least one contact, means for selectively connecting said at least one contact to one of said terminals, a constant source voltage divider having an input and an output circuit, and means for connecting said at least one contact to said voltage divider input circuit, said constant source voltage divider having a plurality of stages each for providing at least three discrete ratios of output to input voltage and a constant source impedance, each of said compensating impedances having a value such that the impedance seen by the input of said constant source voltage divider is constant independent of the terminal to which said at least one contact is connected.

19. A voltage divider comprising a plurality of stages each having a pair of input terminals, each of said stages having a pair of output terminals, each of said stages having a variable voltage divider circuit for varying the ratio of the voltage across the respective output terminals to the voltage across the respective input terminals in at least three steps and compensating impedances for providing a constant output impedance as seen at the output terminals independent of the value of said ratio, and means coupled to the output terminals of all of said stages for deriving an output voltage which is a linear combination of the voltages across the respective output terminals, each of said variable voltage divider stages having at least three impedance elements connected in series between the respective pair of input terminals and means for selectively connecting only one of said compensating impedances between said series connected impedance elements and said output terminals in the same stage, with one of said compensating impedances being connectable between each of the two ends of the series connected impedance elements in each stage and the output terminals in the same stage.

(References on following page)

References Cited

UNITED STATES PATENTS

| | | | |
|---|---|---|---|
| 1,912,719 | 6/1933 | Nicolas | 333—81 |
| 2,536,501 | 1/1951 | Hood et al. | 333—81 |
| 2,572,545 | 10/1951 | Walker | 323—43.5 |
| 2,784,369 | 3/1957 | Fenemore et al. | 323—79 |
| 2,832,036 | 4/1958 | Cutler et al. | 323—43.5 X |
| 2,954,517 | 9/1960 | Menzel | 323—74 |
| 3,262,049 | 7/1966 | Watson et al. | 323—94 X |
| 3,403,324 | 9/1968 | Bradley | 323—80 |

LEE T. HIX, Primary Examiner

G. GOLDBERG, Assistant Examiner

U.S. Cl. X.R.

323—79, 80, 81, 94; 333—81; 338—201